F. FIECHTER.
LUBRICATOR.
APPLICATION FILED AUG. 26, 1914.

1,156,768.  Patented Oct. 12, 1915.

*Fig. 8.*    *Fig. 6.*    *Fig. 7.*

Witnesses:
Walter Chism
Walter R. Sullinger

Inventor:
Frederick Fiechter
by his Attorneys.
Howson + Howson

UNITED STATES PATENT OFFICE.

FREDERICK FIECHTER, OF PHILADELPHIA, PENNSYLVANIA, ASSIGNOR OF ONE-HALF TO OSCAR H. LUCKER, OF PHILADELPHIA, PENNSYLVANIA.

LUBRICATOR.

1,156,768.

Specification of Letters Patent. Patented Oct. 12, 1915.

Application filed August 26, 1914. Serial No. 858,667.

*To all whom it may concern:*

Be it known that I, FREDERICK FIECHTER, a citizen of the United States, residing in Philadelphia, Pennsylvania, have invented certain Improvements in Lubricators, of which the following is a specification.

One object of this invention is to provide a novel and relatively simple device for automatically feeding solid lubricant such as graphite into a steam line or other steam container in which there is an intermittent or variable flow, the invention also contemplating means whereby the flow of lubricant from the container may be accurately regulated.

Another object of the invention is to provide a graphite feeding lubricator which shall include a member movable in one direction by a current of flowing fluid such as steam and movable in the opposite direction by a spring when such current flow has ceased or has varied in degree, to cause feeding of graphite from a container to any desired receptacle such as a steam line.

These objects and other advantageous ends I secure as hereinafter set forth reference being had to the accompanying drawings in which:—

Figure 1:
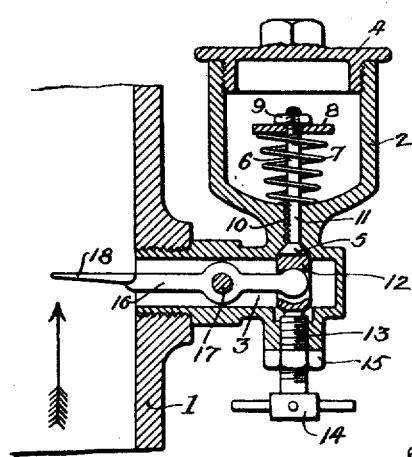
Figure 3:
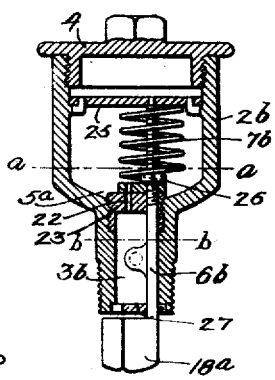
Figure 2:
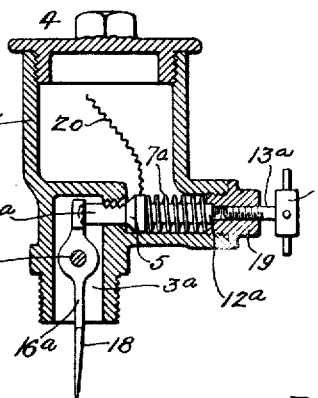
Figure 4:
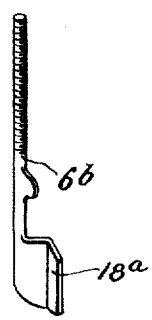
Figure 5:
Figure 5:
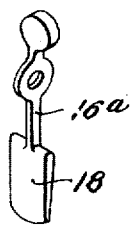

Figure 1 is a vertical section of a portion of a steam main illustrating my invention as applied thereto; Figs. 2 and 3 are vertical sections of slightly modified forms of my lubricator; Figs. 4 and 5 are horizontal sections on the lines a—a and b—b, Fig. 3, and Figs. 6, 7 and 8 are perspective views of the steam actuated members employed in those forms of my invention shown in Figs. 1 to 3 inclusive.

In the above drawings 1 represents a portion of a steam main in which there is a pulsating or intermittent flow of steam due to the alternate admission and cutoff of steam to an engine, and in order to provide a definite supply of graphite to this main for the lubrication of the valves and piston of such engine, I connect to said steam main a container in the form of a cup 2 normally closed by a removable cap 4, and having in the present instance, a horizontal tubular outlet 3. Between the hollow interior of the cup 2 and the conduit 3 is a passage at whose lower end is formed a conical seat for the reception of a valve 5 fixed to a stem 6, which extends through said passage into the interior of the cup. Said valve is normally kept seated by means of a spring 7 acting between the bottom of the cup and a washer 8 retained on the upper end of the stem 6 by a nut 9. The wall of the passage from the cup to the conduit 3 is preferably formed with notches or serrations 10 and that portion of the stem immediately adjacent the same is also serrated as indicated at 11.

Attached to the valve 5 is a vertically slotted head 12 whose lower end is engaged by an adjusting screw 13 threaded through the suitably thickened wall of the conduit 3 and having an armed operating head 14 whereby it may be turned. Said screw has mounted upon its outer portion a jam nut 15 whereby it may be held in any adjusted position.

Within the conduit 3 is fulcrumed an actuating lever 16 of any order and construction, which is shown as mounted upon a transverse pin 17 and having one arm or end extending into the slot of the head 12 The opposite arm of said lever (which is shown as of the first class) projects into the steam line 1 where it is provided with a vane or plate-like extremity 18 lying in a plane substantially at right angles to the line of flow of the steam or other fluid in said pipe.

Under conditions of operation the cup 2 is filled with graphite or other suitable lubricant, and the screw 13 is backed off by turning the armed head 14 so that its inner end is spaced away from the lower end of the valve head 12. If now the steam flows in the main 1 in the direction indicated by the arrow, it acts upon the receiving vane or paddle 18, turning the lever 16 downwardly against the action of the spring 7. Such movement causes a certain definite quantity of graphite to be drawn down by the teeth or indentations 11 of the valve rod 6 into the passage leading from the cup 2 to the conduit 3 and when said steam flow to the conduit 3 and when said steam flow ceases or is temporarily checked, the spring 7 acts to move the valve stem upwardly thus seating the valve and returning the lever to its original position. A second flow of steam in the main 1 causes another movement of the lever 16 on its pivot, so that relatively small quantities of graphite are successively drawn out of the cup 2 through the passage and past the valve 5 into the discharge conduit 3, from whence they are free to pass into the steam main 1.

Obviously the amount of material fed from the cup may be regulated by adjusting the possible arc of oscillation of the lever 16 by means of the screw 13 which may be moved nearer to or farther from the head 12 to vary the possible movement thereof.

In any case each positive flow of steam through the main 1 will act upon the plate 18 of the lever 16 to open the valve 5 so as to permit passage of a small quantity of graphite and upon cessation of this flow the spring 7 will act upon the valve rod 6 to again seat the valve, it being noted that the toothed construction of the valve stem and of the walls of the passage in which it operates serves to insure the delivery of the lubricant in finely divided form while the reciprocation of the valve stem prevents packing of the lubricant in the cup.

If desired the cup may be designed with the discharge conduit on the bottom instead of at the side, and in such case the lubricator would be constructed as shown in Fig. 2. As before, there is provided this conduit indicated at 3ª designed to screw into the wall of the steam main and at its inner end connected through a horizontally extending passage with the bottom of the lubricant containing cup 2ª. The inner end of said passage is formed into a valve seat in line with an opening in one side of the cup, which opening is normally closed by a cap 19 formed with a hole threaded for the reception of a screw 13ª having an armed head 14ª. Between the valve 5 and the inner end of this cover 19 is mounted a spring 7ª which surrounds the valve stem whose opposite end 6ª projects into the conduit 3ª where it abuts upon one end of the actuating lever 16ª which is fulcrumed upon a pin 17ª within said conduit. The opposite end of this lever terminates in a plate 18 which as in the device shown in Fig. 1, projects beyond the end of the conduit 3ª into the passageway of the steam main 1 so as to be acted on by the steam flow therein. In this case I attach to the valve 5 a stirring device such as the wire 20 which extends upwardly into the body of the cup 2ª in such manner that each movement of the valve moves said wire through the mass of lubricant within the cup and prevents it from packing. As before, the valve stem 6ª and the adjacent wall of the passage in which it operates are provided with serrations or recesses whereby definite amounts of lubricant are periodically moved from the cup into and through the passage 3ª. In this case the part 12ª of the valve stem extends into position to be engaged by the adjusting screw 13, which may be moved in or out to vary the distance the valve 5 may move from its seat, it being possible to so far set it up as to hold the valve immovable on its seat and thus permit of the cup being opened for filling or inspection.

If desired other forms of valves may be employed to regulate or control the feeding of lubricant from the container into a steam line wherein there is a variable or pulsating flow capable of actuating said valve, and as an example of such modifications I have in Fig. 3 illustrated a lubricator cup 2ᵇ having an axially placed delivery conduit 3ᵇ connecting with the interior of the cup through a relatively small passage 22 formed in a plug 23 fixed in the bottom thereof. Upon the top surface of this plug is mounted an oscillatory valve 5ª having a vertical port or passage which may be brought into line with the passage 22 of the plug. This valve is kept seated by a spring 7ᵇ which extends between it and a cross-bar 25 at the top of the casing, and has a stem 6ᵇ rigidly fixed to it by means of a jam nut 26. The spring, in addition to keeping the valve seated, is so connected to it that it normally maintains it in a position with its passage out of line with the passage 22 and the valve stem 6ᵇ, in addition to having a bearing where it passes through the plug 23, has a second bearing in a cross-member 27 mounted within the conduit 3ᵇ. In this case the valve stem 6ᵇ has connected to or mounted upon its lower end a dished or cupped plate 18ª connected to it at one side, so that whenever a flow of steam occurs in the main or pipe to which the conduit 3ᵇ is attached, said plate with the valve stem is caused to turn about the axis of said stem and momentarily bring the holes 22 and 28 into line. As a result a small quantity of graphite is free to pass from the cup into the conduit and thence into the steam main. In any case the alternate flow and cutting off of steam in the main 1 causes an oscillatory movement of the lever 16 or the rod 6ᵇ, as the case may be, with the result that a valve is opened to permit of the out-flow of a relatively small amount of lubricant.

While I have described my invention as applied to a steam line, it is obvious that it may with equal advantage be applied to air, water or other lines containing flowing fluid and while the device is useful in feeding graphite, obviously other solid or liquid lubricant may be fed without in any way departing from my invention.

It will be understood that the serrations in the valve stem and in the walls of the passage therefore not only insure feeding of the lubricant but act to equalize the size of the particles before they are delivered to the main 1.

I claim:—

1. The combination of a receptacle for holding solid lubricant having an outlet; a valve for said outlet; a spring normally holding said valve closed; a stirrer in addition to the spring carried on the valve and extending into the container; a member connected to the valve and extending outside the container; and a fluid receiving vane connected to said outwardly extended part of said member.

2. The combination in a lubricator of a container having an outlet; a valve for said outlet; a spring normally holding the valve closed; a member connected to the valve and extending outside the container; a steam receiving vane on the outer portion of said member; and adjustable means for limiting the amount of opening of the valve.

3. The combination in a lubricator of a container having an outlet; a valve for said outlet having a stem; a spring acting on said stem to keep the valve normally seated; an adjusting screw in line with the valve stem to limit the amount of movement of the valve; an actuating member connected to the valve and extending outside the container; with a steam receiving vane on said member.

4. The combination in a lubricator of a container having an outlet provided with a serrated surface; a valve having a serrated stem coacting with the serrations of said outlet for grinding solid lubricant; and means for periodically actuating said valve.

5. The combination in a lubricator of a container having an outlet provided with a serrated wall; a valve having a serrated stem formed to coact with the serrations of the outlet wall to cause a discharge of material when said valve is actuated; and means for periodically moving the valve.

6. The combination of a container having an outlet conduit; a lever pivoted in said conduit and having a steam vane outside of the latter; a valve controlling flow of material from the container to said conduit and connected to one arm of the lever; a device for adjusting the possible opening of the valve; and a spring normally holding the valve closed.

7. The combination of a cup having an outlet conduit and a valve seated passage leading thereto; a serrated rod movable in said passage; a valve on said rod in position to control flow of solid material from the cup between the wall of the passage and the rod into the conduit; a spring acting to move the valve to a closed position; with a lever of the first order pivoted in the conduit and extending in a line substantially at right angles to the rod, said lever having one arm operatively connected to the valve and being provided with a steam vane projecting outside of the conduit.

In testimony whereof, I have signed my name to this specification, in the presence of two subscribing witnesses.

FREDERICK FIECHTER.

Witnesses:
WILLIAM E. BRADLEY,
WM. A. BARR.

It is hereby certified that the name of the assignee in Letters Patent No. 1,156,768, granted October 12, 1915, upon the application of Frederick Fiechter, of Philadelphia, Pennsylvania, for an improvement in "Lubricators," was erroneously written and printed as "Oscar H. Lucker," whereas said name should have been written and printed as *Oscar H. lucker*, as shown by the records of assignments in this Office; and that the said Letters Patent should be read with this correction therein that the same may conform to the record of the case in the Patent Office.

Signed and sealed this 2nd day of November, A. D., 1915.

[SEAL.]
R. F. WHITEHEAD,
*Acting Commissioner of Patents.*